(12) United States Patent
Stelljes, Jr. et al.

(10) Patent No.: US 7,314,664 B2
(45) Date of Patent: *Jan. 1, 2008

(54) EMBOSSED MULTI-PLY FIBROUS STRUCTURE PRODUCT AND PROCESS FOR MAKING SAME

(75) Inventors: Michael Gomer Stelljes, Jr., Mason, OH (US); Christopher Scott Kraus, Sunman, IN (US); George Vincent Wegele, Fairfield, OH (US); Kevin Benson McNeil, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 340 days.

This patent is subject to a terminal disclaimer.

(21) Appl. No.: 10/950,706

(22) Filed: Sep. 27, 2004

(65) Prior Publication Data

US 2005/0069679 A1    Mar. 31, 2005

Related U.S. Application Data

(63) Continuation-in-part of application No. 10/673,659, filed on Sep. 29, 2003.

(51) Int. Cl.
*B32B 3/00* (2006.01)
*B32B 3/28* (2006.01)
*D21H 27/40* (2006.01)

(52) U.S. Cl. ............... 428/166; 428/154; 428/172; 428/218; 162/109

(58) Field of Classification Search .......... 428/154, 428/156, 166, 172, 212, 218; 162/109, 118
See application file for complete search history.

(56) References Cited

U.S. PATENT DOCUMENTS

| | | | |
|---|---|---|---|
| 1,863,973 | A | 6/1932 | Ellis, Jr. |
| 3,414,459 | A | 12/1968 | Wells |
| 3,556,907 | A | 1/1971 | Nystrand |
| 3,672,950 | A | 6/1972 | Murphy et al. |
| 3,673,060 | A | 6/1972 | Murphy |
| 3,684,603 | A | 8/1972 | Iltis |
| 3,708,366 | A | 1/1973 | Donnelly |
| 3,867,225 | A | 2/1975 | Nystrand |
| 4,135,024 | A | 1/1979 | Callahan |
| 4,320,162 | A | 3/1982 | Schulz |
| 4,325,773 | A | 4/1982 | Schulz |
| 4,326,002 | A | 4/1982 | Schulz |

(Continued)

FOREIGN PATENT DOCUMENTS

DE    18 07 842 A1    7/1969

(Continued)

OTHER PUBLICATIONS

U.S. Appl. No. 10/952,119, Horenziak et al., date filed Sep. 28, 2004.
U.S. Appl. No. 10/673,659, Stelljes, Jr. et al., date filed Sep. 29, 2003.

*Primary Examiner*—Donald J. Loney
(74) *Attorney, Agent, or Firm*—Peter T. Nguyen; C. Brant Cook; Stephen T. Murphy

(57) ABSTRACT

Multi-ply fibrous structure products, more specifically embossed multi-ply fibrous structure products and methods for making same are provided.

9 Claims, 3 Drawing Sheets

U.S. PATENT DOCUMENTS

| | | | |
|---|---|---|---|
| 4,333,979 A * | 6/1982 | Sciaraffa et al. ............ 428/179 |
| 4,610,743 A | 9/1986 | Salmeen |
| 4,759,967 A | 7/1988 | Bauernfeind |
| 4,913,911 A | 4/1990 | Wildt |
| 4,921,034 A | 5/1990 | Burgess |
| 4,927,588 A | 5/1990 | Schulz |
| 5,158,819 A | 10/1992 | Goodman, Jr. et al. |
| 5,173,351 A | 12/1992 | Ruppel |
| 5,294,475 A | 3/1994 | McNeil |
| 5,339,730 A | 8/1994 | Ruppel et al. |
| 5,409,572 A | 4/1995 | Kershaw |
| 5,436,057 A | 7/1995 | Schulz |
| 5,468,323 A | 11/1995 | McNeil |
| 5,490,902 A | 2/1996 | Schulz |
| 5,529,563 A | 6/1996 | Veith et al. |
| 5,536,506 A | 7/1996 | Majeed et al. |
| 5,573,830 A | 11/1996 | Schulz |
| 5,597,639 A | 1/1997 | Schulz |
| 5,620,776 A | 4/1997 | Schulz |
| 5,620,779 A | 4/1997 | Schulz |
| 5,779,965 A | 7/1998 | Beuther et al. |
| 5,840,404 A | 11/1998 | Graff et al. |
| 5,846,636 A | 12/1998 | Ruppel et al. |
| 5,868,168 A | 2/1999 | Laurent |
| 5,874,156 A | 2/1999 | Schulz |
| 5,904,812 A | 5/1999 | Salman et al. |
| 6,077,390 A | 6/2000 | Salman et al. |
| 6,077,590 A | 6/2000 | Archer et al. |
| 6,106,928 A | 8/2000 | Laurent et al. |
| 6,113,723 A | 9/2000 | McNeil et al. |
| 6,129,815 A | 10/2000 | Larson |
| 6,129,972 A | 10/2000 | McNeil et al. |
| 6,165,319 A | 12/2000 | Heath et al. |
| 6,299,729 B1 | 10/2001 | Heath et al. |
| 6,331,228 B1 | 12/2001 | Heath et al. |
| 6,344,111 B1 | 2/2002 | Wilhelm |
| 6,361,308 B2 | 3/2002 | Wendler, Jr. |
| 6,468,392 B2 | 10/2002 | Oriarian |
| 6,524,683 B1 | 2/2003 | Roussel |
| 6,571,673 B2 | 6/2003 | Piazza |
| 6,602,577 B1 | 8/2003 | Ostendorf et al. |
| 6,649,024 B2 | 11/2003 | Oriarian et al. |
| 6,699,360 B2 | 3/2004 | Heath et al. |
| 6,755,928 B1 | 6/2004 | Biagiotti |
| 6,802,937 B2 | 10/2004 | Johnston et al. |
| 6,911,573 B2 | 6/2005 | Chen et al. |
| 2003/0111169 A1 | 6/2003 | Baggot et al. |
| 2003/0192662 A1 | 10/2003 | Heath et al. |
| 2004/0038006 A1 | 2/2004 | Biagotti |
| 2004/0163783 A1 | 8/2004 | Muller |
| 2004/0166290 A1 | 8/2004 | Sembritzki et al. |
| 2004/0209050 A1 | 10/2004 | Andersson |
| 2004/0231813 A1 | 11/2004 | Basler et al. |
| 2004/0247836 A1 | 12/2004 | Biagotti |
| 2005/0092881 A1 | 5/2005 | Schulz et al. |
| 2005/0098281 A1 | 5/2005 | Schulz et al. |

FOREIGN PATENT DOCUMENTS

| | | |
|---|---|---|
| EP | 1312466 A1 | 11/2001 |
| EP | 1321287 A2 | 12/2001 |
| EP | 1 232 854 | 4/2005 |
| GB | 2 377 674 A1 | 1/2003 |
| WO | WO 94/06623 | 3/1994 |
| WO | WO 98/50481 | 11/1998 |
| WO | WO 00/73053 | 12/2000 |
| WO | WO 03/031170 | 10/2001 |
| WO | WO 03/072344 | 9/2003 |

* cited by examiner

EMBOSSED MULTI-PLY FIBROUS STRUCTURE PRODUCT AND PROCESS FOR MAKING SAME

This application is a continuation-in-part of U.S. application Ser. No. 10/673,659 filed Sep. 29, 2003, allowed Sep. 25, 2007.

FIELD OF THE INVENTION

The present invention relates to multi-ply fibrous structure products, more specifically embossed multi-ply fibrous structure products and methods for making same.

BACKGROUND OF THE INVENTION

Conventional embossed multi-ply fibrous structure products having embossment heights of 1000 µm or greater are known in the art. However, such conventional embossed multi-ply fibrous structure products contained bonded, densified embossment sites. Such conventional embossed multi-ply fibrous structure products exhibited product property deficiencies, especially with respect to the wet burst strength. Such conventional embossed multi-ply fibrous structure products exhibited a wet burst strength of 303 g or less. In addition, such conventional embossed multi-ply fibrous structure products suffered from problems associated with the adhesive between the plies moving when embossed prior to achieving acceptable plybond strength. Tensile strengths in such products were also typically lower than acceptable.

Prior art attempts to overcome the prior art's product property deficiencies included applying excess adhesive to the plies of the fibrous structure prior to embossing and then marrying the plies to form a multi-ply fibrous structure product. The adhesive covered greater than 40% of the surface area of the plies. The relatively large amount of adhesive was required to get acceptable plybond strength in the product.

Accordingly, there is a need for an embossed multi-ply fibrous structure product wherein the plies of the multi-ply fibrous structure product were bonded together by an adhesive over less than 40% of the surface area of the plies. Further, there is a need for an embossed multi-ply fibrous structure product that comprises embossments having an embossment height of greater than 1000 µm and a wet burst strength of at least 305 g and/or a plybond strength of at least 4 g/in.

SUMMARY OF THE INVENTION

The present invention fulfills the need described above by providing an embossed multi-ply fibrous structure product.

In one aspect of the present invention, an embossed multi-ply fibrous structure product comprising two or more plies of fibrous structure bonded together along adjacent surfaces of the two or more plies by an adhesive to form a bond area, wherein the bond area is less than about 30% of the bonded adjacent surfaces, wherein the product comprises two faces, wherein one face comprises non-adhesively bonded embossed sites and the other face comprises adhesively bonded non-embossed sites, and wherein the fibrous structure product exhibits an embossment height of at least about 1000 µm, is provided.

In another aspect of the present invention, an embossed multi-ply fibrous structure product comprising two or more plies of fibrous structure bonded together at a plybond strength of at least about 4 g/in along adjacent surfaces of the two or more plies by an adhesive to form a bond area, wherein the bond area is less than about 30% of the bonded adjacent surfaces, wherein the product exhibits an embossment height of at least about 1000 µm, and a wet burst of at least about 305 g, is provided.

In still another aspect of the present invention, an embossed multi-ply fibrous structure product comprising a first face and a second face, wherein the first face comprises non-adhesively bonded embossed sites and the second face comprises adhesively bonded non-embossed sites, is provided.

In even another aspect of the present invention, an embossed multi-ply fibrous structure product comprising a first face and a second face, wherein the first face comprises non-densified embossed sites and the second face comprises densified non-embossed sites, is provided.

In yet another aspect of the present invention, a method for making an embossed multi-ply fibrous structure product comprising the steps of:

a) adhesively binding two or more plies of fibrous structure together to form a multi-ply fibrous structure by applying an adhesive to at least one surface of the two or more plies, wherein the adhesive is applied to less than about 30% of at least one of the two or more plies surfaces;

b) embossing the multi-ply fibrous structure such that the multi-ply fibrous structure exhibits an embossment height of at least about 1000 µm to form the embossed multi-ply fibrous structure product, is provided.

In still yet another aspect of the present invention, a method for making an embossed multi-ply fibrous structure product comprising the steps of:

a) providing a first ply of fibrous structure;
b) providing a second ply of fibrous structure;
c) applying an adhesive to a surface of the first ply of fibrous structure such that the adhesive contacts less than about 30% of the surface area of the first ply of fibrous structure;
d) combining and marrying the first and second plies of fibrous structure along adjacent surfaces of the first and second plies of fibrous structure such that the adhesive bonds the two plies together to form a multi-ply fibrous structure exhibiting a plybond strength of at least about 4 g/in; and
e) embossing the multi-ply fibrous structure such that an embossed multi-ply fibrous structure product exhibiting an embossment height of at least 1000 µm is formed, is provided.

Accordingly, the present invention provides an embossed multi-ply fibrous structure product and methods for making embossed multi-ply fibrous structure products.

DETAILED DESCRIPTION OF THE INVENTION

Figure 1A:
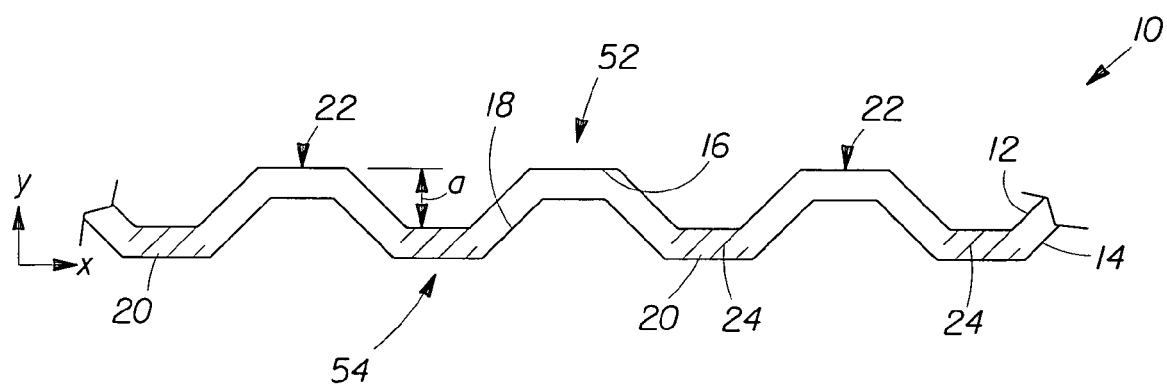
FIG. 1A is a fragmentary side sectional view of one embodiment of an embossed multi-ply fibrous structure product according to the present invention.

"Fiber" as used herein means an elongate particulate having an apparent length greatly exceeding its apparent width, i.e. a length to diameter ratio of at least about 10. More specifically, as used herein, "fiber" refers to papermaking fibers. The present invention contemplates the use of a variety of papermaking fibers, such as, for example, natural fibers or synthetic fibers, or any other suitable fibers, and any combination thereof. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. No. 4,300,981 and U.S. Pat. No. 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking. In addition to the above, fibers and/or filaments made from polymers, specifically hydroxyl polymers may be used in the present invention. Nonlimiting examples of suitable hydroxyl polymers include polyvinyl alcohol, starch, starch derivatives, chitosan, chitosan derivatives, cellulose derivatives, gums, arabinans, galactans and mixtures thereof.

"Wet Burst Strength" as used herein is a measure of the ability of a fibrous structure and/or a fibrous structure product incorporating a fibrous structure to absorb energy, when wet and subjected to deformation normal to the plane of the fibrous structure and/or fibrous structure product.

"Basis Weight" as used herein is the weight per unit area of a sample reported in lbs/3000 ft$^2$ or g/m$^2$. Basis weight is measured by preparing one or more samples of a certain area (m$^2$) and weighing the sample(s) of a fibrous structure according to the present invention and/or a fibrous structure product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples (m$^2$). The basis weight (g/m$^2$) is calculated by dividing the average weight (g) by the average area of the samples (m$^2$).

"Machine Direction" or "MD" as used herein means the direction parallel to the flow of the fibrous structure through the papermaking machine and/or product manufacturing equipment.

"Cross Machine Direction" or "CD" as used herein means the direction perpendicular to the machine direction in the same plane of the fibrous structure and/or fibrous structure product comprising the fibrous structure.

"Sheet Caliper" or "Caliper" as used herein means the macroscopic thickness of a sample.

"Densified" as used herein means a portion of a fibrous structure product that exhibits a greater density than another portion of the fibrous structure product. For example, a densified area of the embossed multi-ply fibrous structure product according to the present invention is typically 0.19 g/cc or greater. In one embodiment of the present invention, the embossed multi-ply fibrous structure product comprises a densified area that is at least 2 times the density of another portion of the embossed multi-ply fibrous structure product.

"Non-densified" as used herein means a portion of a fibrous structure product that exhibits a lesser density than another portion of the fibrous structure product. For example, a non-densified area of the embossed multi-ply fibrous structure product according to the present invention is typically less than about 0.19 g/cc. In one embodiment of the present invention, the embossed multi-ply fibrous structure product comprises a non-densified area that is less than 2 times the density of another portion of the embossed multi-ply fibrous structure product.

"Stretch" as used herein is determined by measuring a fibrous structure's Dry Tensile Strength in MD and/or CD.

"Effective Caliper" as used herein means the radial thickness a layer of embossed multi-ply fibrous structure product occupies within a convolutely wound roll of such embossed multi-ply fibrous structure product. In order to facilitate the determination of effective caliper, an Effective Caliper Test Method is described herein. The effective caliper of an embossed multi-ply fibrous structure product can differ from the sheet caliper of the embossed multi-ply fibrous structure product due to winding tension, nesting of deformations, etc.

"Apparent Density" or "Density" as used herein means the basis weight of a sample divided by the caliper with appropriate conversions incorporated therein. Apparent density used herein has the units g/cm$^3$ (alternatively g/cc).

"Bulk Density" as used herein means the apparent density of an entire fibrous structure product rather than a discrete area thereof.

"Ply" or "Plies" as used herein means an individual fibrous structure optionally to be disposed in a substantially contiguous, face-to-face relationship with other plies, forming a multi-ply fibrous structure. It is also contemplated that a single fibrous structure can effectively form two "plies" or multiple "plies", for example, by being folded on itself.

Embossed Multi-Ply Fibrous Structure Product

The embossed multi-ply fibrous structure product according to the present invention comprises two or more plies of fibrous structure that are bonded together along their adjacent surfaces by an adhesive. The adhesive may cover less than about 30% and/or from about 0.1% to about 30% and/or from about 3% to about 30% and/or from about 5% to about 25% and/or from about 5% to about 20% of the bonded adjacent surfaces. The adhesive may be applied to one or more of the plies of fibrous structure in a continuous and/or discontinuous network pattern, such as separate, discrete dots and/or separate, discrete stripes.

In one embodiment of the present invention, the embossed multi-ply fibrous structure exhibits a plybond strength of at least about 4 g/in and/or at least about 5 g/in and/or at least about 6 g/in as measured by the Plybond Strength Test Method described herein.

In another embodiment of the present invention, the embossed multi-ply fibrous structure product comprises a first face and a second face, wherein the first face comprises non-adhesively bonded embossed sites and the second face comprises adhesively bonded non-embossed sites.

In still another embodiment of the present invention, the embossed multi-ply fibrous structure product comprises a first face and a second face, wherein the first face comprises non-densified embossed sites and the second face comprises densified non-embossed sites.

In even another embodiment of the present invention, the embossed multi-ply fibrous structure product exhibits a wet burst strength of at least 305 g and/or at least about 315 g and/or at least about 325 g and/or at least about 400 g as measured by the Wet Burst Strength Test Method as described herein.

In yet another embodiment of the present invention, the embossed multi-ply fibrous structure product comprises embossed sites of at least 1000 μm and/or from about 1000 μm to about 5000 μm and/or from about 1100 μm to about 3000 μm and/or from about 1100 μm to about 2000 μm as measured by the Embossment Height Test Method described herein.

In even another embodiment of the present invention, the embossed multi-ply fibrous structure product comprises densified and non-densified regions wherein the densified regions exhibit a caliper of 10 mils or less and/or from about 0.1 to about 6 mils and/or from about 1 to about 5 mils.

In still yet another embodiment of the present invention, the embossed multi-ply fibrous structure product wherein the product exhibits a sheet caliper of at least about 30 mils and/or at least about 40 mils and/or at least about 50 mils as measured by the Sheet Caliper Test Method.

In even still another embodiment of the present invention, the embossed multi-ply fibrous structure product exhibits a cross machine direction stretch at peak load of greater than about 8% and/or greater than about 10% and/or greater than about 12% as measured by the Stretch Test Method described herein.

The embossed multi-ply fibrous structure product may be in roll form. When in roll form, the embossed multi-ply fibrous structure product may be convolutely wound about a core or may be convolutely wound without a core.

The embossed multi-ply fibrous structure product may exhibit a sheet caliper to effective caliper ratio of greater than 1.1 and/or greater than 1.2 and/or greater than 1.3.

The embossed multi-ply fibrous structure product, when in roll form, may exhibit an average effective caliper that is greater than the average sheet caliper of the identical multi-ply fibrous structure product, in its non-embossed form.

The embossed multi-ply fibrous structure product may have a basis weight of between about 10 g/m$^2$ and about 120 g/m$^2$, and bulk density of about 0.10 g/cc or less. Preferably, the basis weight will be below about 60 g/m$^2$; and the bulk density will be about 0.07 g/cc or less. Most preferably, the bulk density will be between about 0.02 g/cc and about 0.07 g/cc as measured by the Basis Weight Method described herein.

The embossed multi-ply fibrous structure product may comprise coloring agents, such as print elements.

A nonlimiting example of an embossed multi-ply fibrous structure product in accordance with the present invention is shown in FIG. 1A. As shown in FIG. 1A, the embossed multi-ply fibrous structure product 10 comprises a first ply of fibrous structure 12 and a second ply of fibrous structure 14 that are adhesively bonded together by an adhesive along their adjacent surfaces 16 and 18, respectively at bond sites 20. The embossed multi-ply fibrous structure product 10 further comprises embossment sites 22. The embossment sites 22 exhibit an embossment height a of at least 1000 μm. The embossment sites 22 extend in the y-direction from the x-plane of the embossed multi-ply fibrous structure product 10. The embossment sites are not adhesively bonded together and are not densified. The bond sites 20 are adhesively bonded together by adhesive 24 and are densified.

Further, the embossed multi-ply fibrous structure product 10 as shown in FIG. 1A comprises a first face 52 and a second face 54.

Figure 1B:
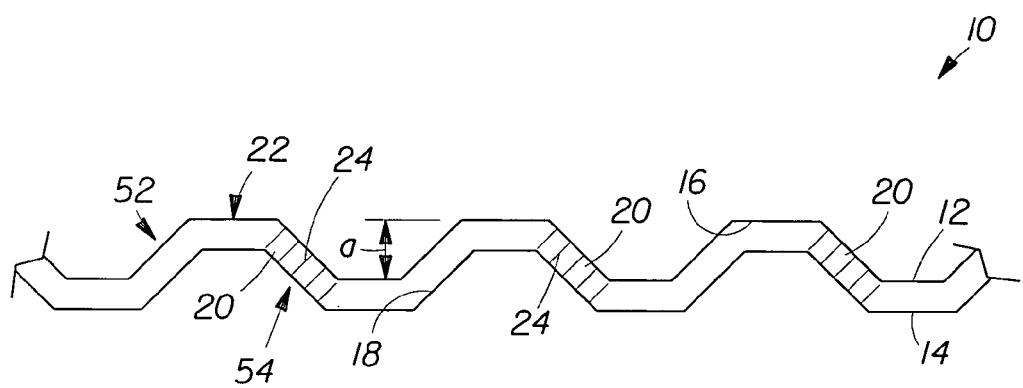
FIG. 1B is a fragmentary side sectional view of another embodiment of an embossed multi-ply fibrous structure product according to the present invention.

Another embodiment of an embossed multi-ply fibrous structure product in accordance with the present invention is shown in FIG. 1B. As shown in FIG. 1B, the embossed multi-ply fibrous structure product 10 comprises a first ply of fibrous structure 12 and a second ply of fibrous structure 14 that are adhesively bonded together by an adhesive along their adjacent surfaces 16 and 18, respectively at bond sites 20. The embossed multi-ply fibrous structure product 10 further comprises embossment sites 22. The embossment sites 22 exhibit an embossment height a of at least 1000 μm. The embossment sites 22 extend in the y-direction from the x-plane of the embossed multi-ply fibrous structure product 10. The embossment sites are not adhesively bonded together and are not densified. The bond sites 20 are adhesively bonded together by adhesive 24 and are densified and plybond strength is maintained.

Further, the embossed multi-ply fibrous structure product 10 as shown in FIG. 1B comprises a first face 52 and a second face 54.

Figure 1C:
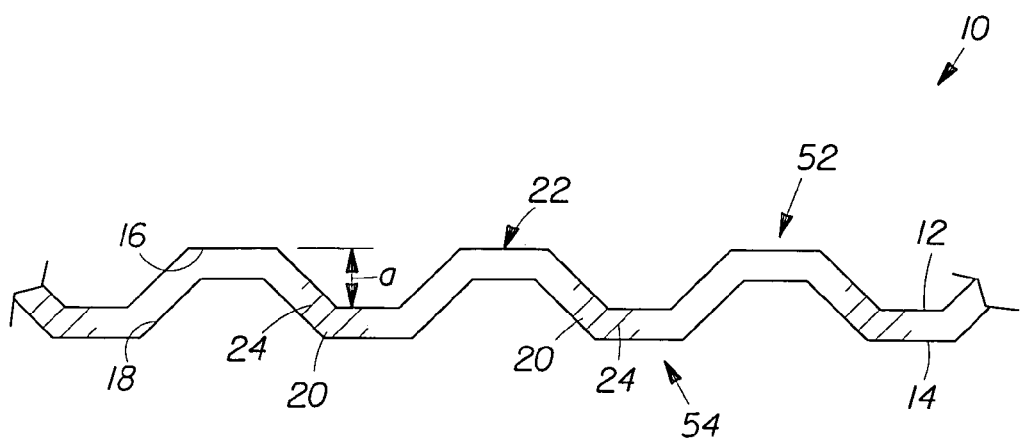
FIG. 1C is a fragmentary side sectional view of another embodiment of an embossed multi-ply fibrous structure product according to the present invention.

Another embodiment of an embossed multi-ply fibrous structure product in accordance with the present invention is shown in FIG. 1C. As shown in FIG. 1C, the embossed multi-ply fibrous structure product 10 comprises a first ply of fibrous structure 12 and a second ply of fibrous structure 14 that are adhesively bonded together by an adhesive along their adjacent surfaces 16 and 18, respectively at bond sites 20. The embossed multi-ply fibrous structure product 10 further comprises embossment sites 22. The embossment sites 22 exhibit an embossment height a of at least 1000 μm. The embossment sites 22 extend in the y-direction from the x-plane of the embossed multi-ply fibrous structure product 10. The embossment sites are not adhesively bonded together and are not densified. The bond sites 20 are adhesively bonded together by adhesive 24 and are densified and plybond strength is maintained.

Further, the embossed multi-ply fibrous structure product 10 as shown in FIG. 1C comprises a first face 52 and a second face 54.

The embossed multi-ply fibrous structure product 10 as shown in FIGS. 1B and 1C may have been designed to look identical to the embossed multi-ply fibrous structure product 10 as shown in FIG. 1A. However, during the embossing step of the method of making the product, the bond sites 20 of the multi-ply fibrous structure from which the product 10 derives may shift relative to the embossment sites 22.

Fibrous Structure

The embossed multi-ply fibrous structure product in accordance with the present invention may comprise a ply of fibrous structure selected from the group consisting of: through-air-dried fibrous structure plies, differential density fibrous structure plies, wet laid fibrous structure plies, air laid fibrous structure plies, conventional fibrous structure plies and mixtures thereof. The embossed multi-ply fibrous structure product may comprise identical types of plies or mixtures of different types of plies.

The fibrous structure may be foreshortened by creeping and/or by wet microcontraction and/or by rush transferring. Alternatively, the fibrous structure may not be foreshortened.

The fibrous structure may be pattern densified. A pattern densified fibrous structure is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. A preferred method of making a pattern densified fibrous structure and devices used therein are described in U.S. Pat. Nos. 4,529,480 and 4,528,239.

The fibrous structure may be uncompacted, non pattern-densified.

The fibrous structure may be of a homogenous or multi-layered construction.

The fibrous structure may be made with a fibrous furnish that produces a single layer embryonic fibrous web or a fibrous furnish that produces a multi-layer embryonic fibrous web.

Ingredients

The fibrous structures and/or embossed multi-ply fibrous structure product made therefrom may comprise one or more ingredients, such as softening agents, absorbency agents such as surfactants, wet strength agents, lotions, antibacterial agents, coloring agents, perfumes.

Methods for Making Embossed Multi-Ply Fibrous Structure Product

The embossed multi-ply fibrous structure product of the present invention may be made by the following nonlimiting example.

Figure 2:
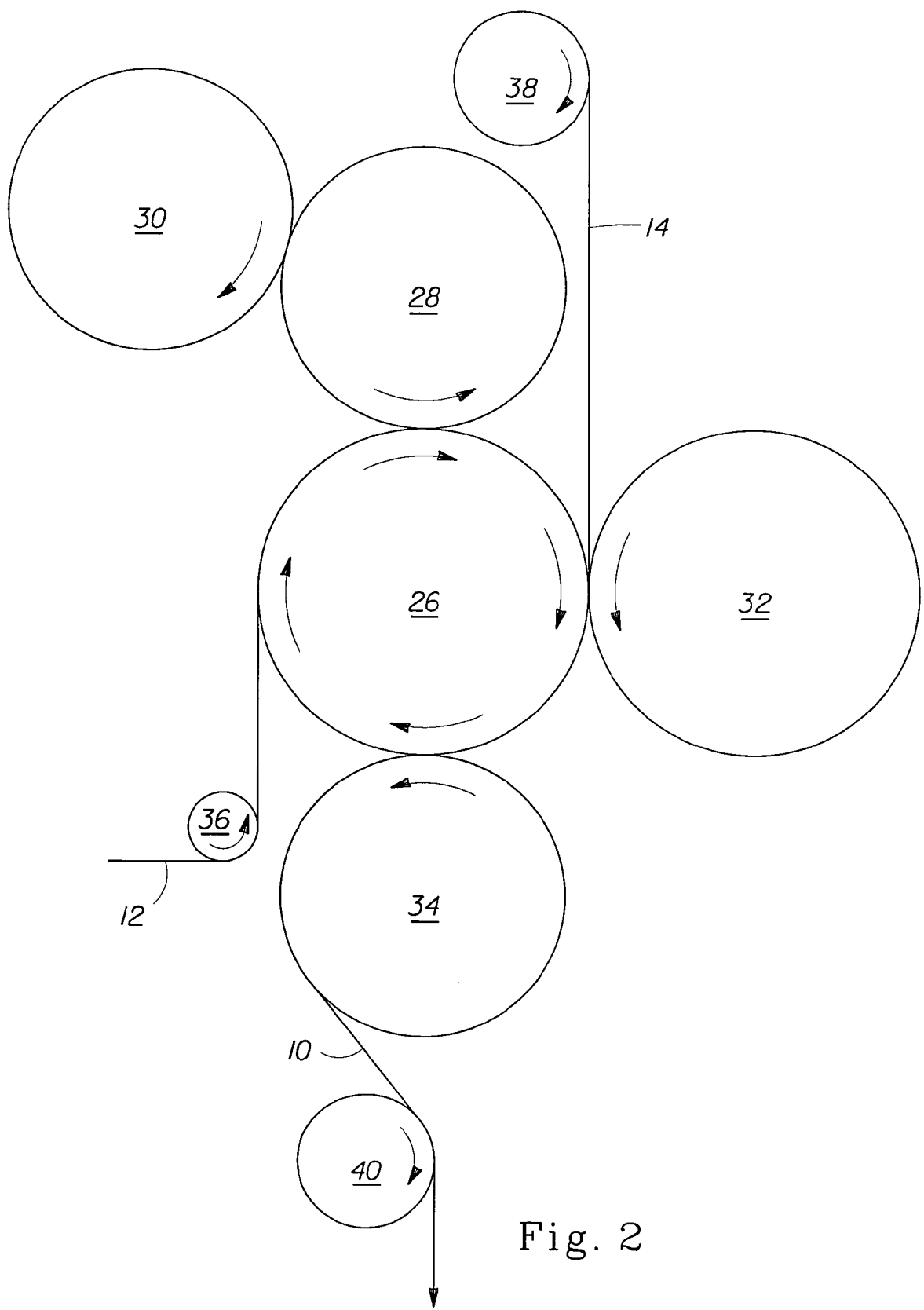
FIG. 2 is a schematic side elevational view of one embodiment of an apparatus used for making an embossed multi-ply fibrous structure product according to the present invention.
Figure 3:
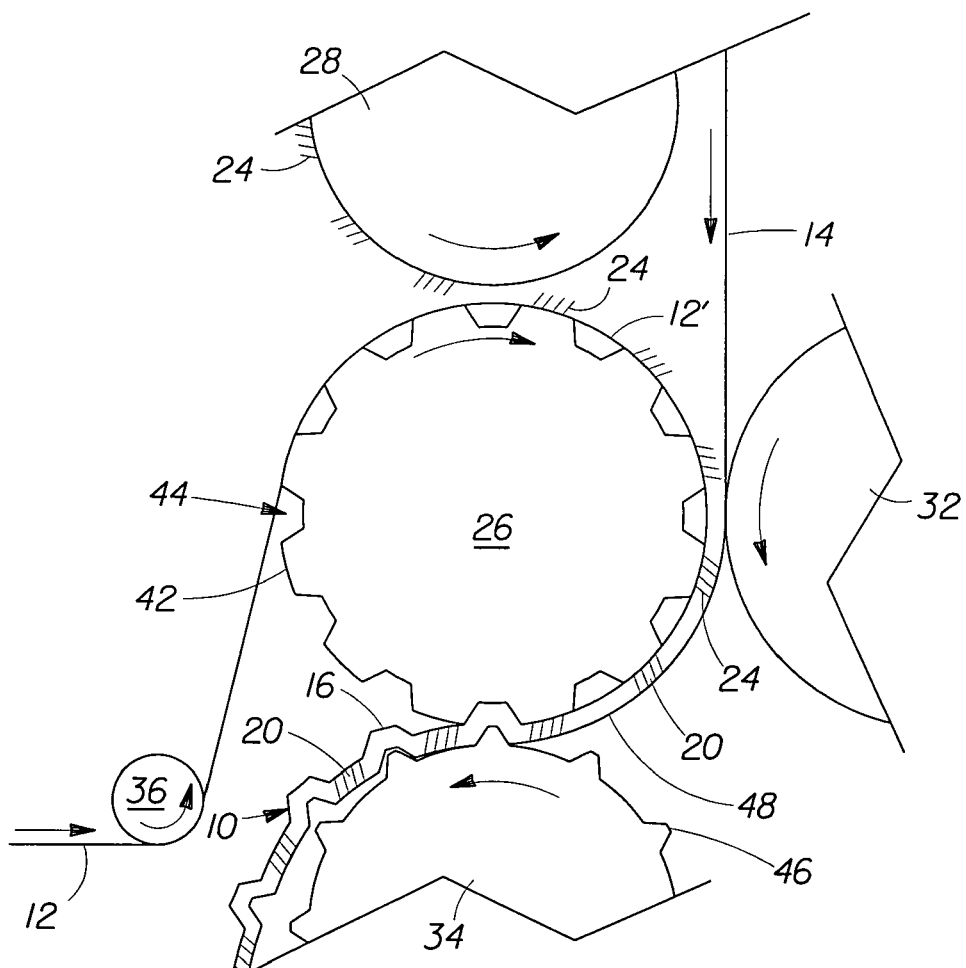
FIG. 3 is an enlarged fragmentary side elevational view of the apparatus shown in FIG. 2.
Figure 4:
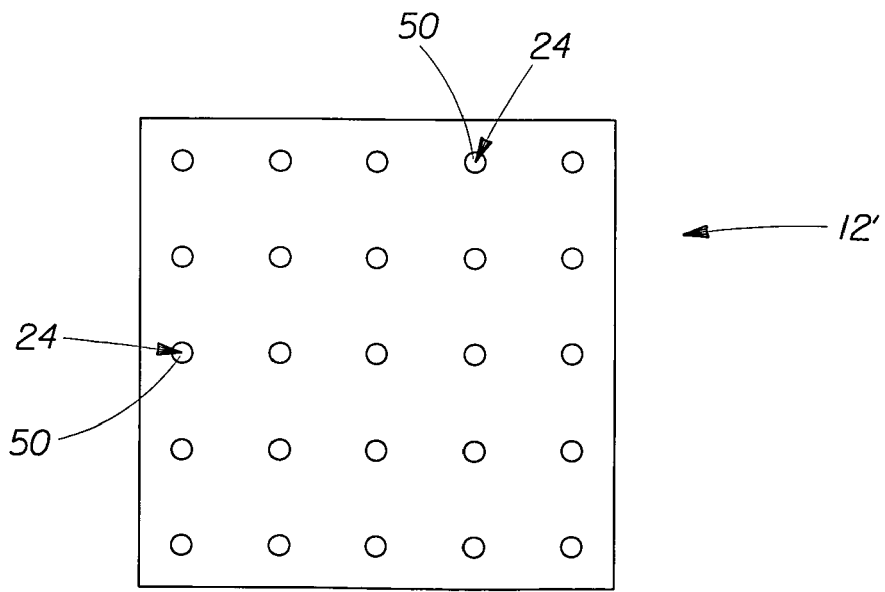
FIG. 4 is a top plan view of a fibrous structure comprising an adhesive in pattern form.

As shown in FIGS. 2 and 3, a first ply of fibrous structure 12 contacts knob surfaces 42 of a first embossing roll 26, such as an engraved steel embossing roll. An applicator roll 28 for applying an adhesive 24 applies the adhesive 24 to the first ply of fibrous structure 12 where the fibrous structure ply 12 is supported by the knob surfaces 42. The adhesive 24 may be applied to the fibrous structure ply 12 in a pattern of discrete dots 50 to produce an adhesive-containing fibrous structure 12' as shown in FIG. 4. The adhesive 24 may be applied to the applicator roll 28 by a gravure system, preferably an offset gravure system comprising a gravure roll 30. The gravure system can meter a specified amount of adhesive 24 from an adhesive pan (not shown) onto the applicator roll 28. Other suitable means of applying the adhesive 24 are known to those of ordinary skill in the art. The adhesive 24 may be any suitable adhesive known in the art. Preferably, the adhesive 24 comprises polyvinyl alcohol.

The first ply of fibrous structure 12 may be under tension suitable for controlling the first ply at some point during its contact with the first embossing roll 26.

A second ply of fibrous structure 14 is brought into contact with the adhesive 24 present on the first ply of fibrous structure 12' at a nip between the first embossing roll 26 and a marrying roll 32. The first ply and second ply are bonded together (i.e., combined) into a multi-ply fibrous structure 48. The marrying roll 32 may be a solid marrying roll, i.e., smooth surface marrying roll.

The marrying roll 32 applies pressure to the multi-ply fibrous structure 48 and the adhesive 24 is pressed between the two plies of fibrous structure at the bond sites 20 where the first ply of fibrous structure 12' is supported by knob surfaces 42. This action bonds the two plies together and produces a plybond strength of at least about 4 g/in. At this point, the multi-ply fibrous structure 48 has not yet been embossed.

Next, the multi-ply fibrous structure 48 enters the interface between the first embossing roll 26 with its depressions 44 and a second embossing roll 34 with its protuberances 46. The second embossing roll 34 may be a steel embossing roll. The protuberances 46 of the second embossing roll 34 and the depressions 44 of the first embossing roll 26 are aligned such that the protuberances 46 nest within the depressions 44. The protuberances 46 are engaged into the depressions 44 at a length of at least about 50 mils such that an embossed height of at least 1000 μm is formed in the multi-ply fibrous structure 48. The embossed multi-ply fibrous structure 10 product exits the nip between the first embossing roll 26 and the second embossing roll 34.

The bond sites 20 are densified at the nip between the first embossing roll 26 and the marrying roll 32 and/or at the interface between the first embossing roll 26 and the second embossing roll 34.

The embossment sites 16 which result from the protuberances 46 of the second embossing roll 34 engaging the depressions 44 of the first embossing roll 26 are non-densified.

Web handling rolls 36, 38 and 40 may be used to control and/or advance the fibrous structures 12 and 14 and/or multi-ply fibrous structure product 10.

Preferred rotational direction of the rolls used in this method are represented by arrows associated with the rolls.

It is desirable that rolls 26, 28, 32 and 34 run at the same speed. Web handling rolls 36, 38 and 40 do not have to run at the same speed as rolls 26, 28, 32 and 34.

Preferred machine direction of the fibrous structures 12 and 14 and/or multi-ply fibrous structure product 10 are represented by arrows associated with the fibrous structures 12 and 14 and/or multi-ply fibrous structure product 10.

Test Methods:

Effective Caliper Test

Effective caliper of a fibrous structure in roll form is determined by the following equation:

$$EC=(RD^2-CD^2)/(0.00127 \times SC \times SL)$$

wherein EC is effective caliper in mils of a single sheet in a wound roll of fibrous structure; RD is roll diameter in inches; CD is core diameter in inches; SC is sheet count; and SL is sheet length in inches.

Plybond Strength Test Method

Plybond strength is measured according to the following test method.

From a single multi-ply fibrous structure comprising an adhesive that bonds two or more of the plies together cut four (4) 3"×8.2" (76.2 mm×208.3 mm) continuous (i.e., non-perforated) fibrous structure sample strips conditioned with all wrapping and/or packaging materials removed, if necessary, at a temperature of 73° F.±2° F. (about 23° C.±1° C.) and a relative humidity of 50%±2% for two (2) hours. This test method measures the plybond strength between two adjacent plies of the fibrous structure.

The fibrous structure sample strips are prepared by using a cutting die [3"×11" (76.2 mm×279.4 mm)] on a plywood base, commercially available from Acme Steel Rule Corp., 5 Stevens St., Waterbury, Conn. 06714. The cutting die must be modified with a soft foam rubber insert material. A JDC Cutter 3" (76.2 mm), Model #JDC-3-12 Precision Sample Cutter, Thwing-Albert Instrument Company, 10960 Dutton Road, Philadelphia, Pa. 19154, having a side capacity to cut 3"×8.2" (76.2 mm×208.3 mm) fibrous structure sample strips is used to cut the fibrous structure samples. The 3" (76.2 mm) wide strip are cut from the center of the fibrous structure. The strips are cut in the MD direction of the fibrous structure. If the fibrous structure is in roll form, cut the samples from greater than 40" (1016 mm) from the ends of the roll.

Individually take each sample strip and gently manually initiate ply separation along the MD direction and continuing for 2" (50 mm).

Do not use samples that contain obvious defects, such as wrinkles, creases, tears, holes, etc.

The measuring of the samples and the preparation of the samples should all occur in a conditioned environment at a temperature of 73° F.±2° F. (about 23° C.±1° C.) and a relative humidity of 50%±2%.

A Thwing-Albert EJA or Intelect-II-STD, Cat. No. 1451-24PG; Thwing-Albert Instrument Company tensile tester is used to measure the plybond strength of the samples. The tensile tester has general purpose air-operated grips (Cat. No. 734K) with 1"×3" (25.4 mm×76.2 mm) inserts. The load cell of the tensile tester is 5000 g. The Sample Size Setting (Load Divider) is set to 3. The tensile tester is operated as follows:

1. Place one of the separated plies of the prepared sample strip in the top grid of the tensile tester. The other ply is placed in the bottom grid. The sample strip needs to be centered in the grips and straight.
2. Activate the tensile tester. When the test is complete, record the value for the load mean. Remove the sample strip from the grips and discard. Check the load cell for a zero reading.
3. Repeat steps 1 and 2 for each sample strip.

The tensile tester will display a value for load mean in g/in (g/25.4 mm). Take the average of four (4) sample strips to obtain the plybond strength of the fibrous structure.

Bond Area Test Method

Bond area is a measurement that a manufacturer of a fibrous structure knows before the fibrous structure is produced. It represents the surface area of adjacent surfaces of two or more plies of fibrous structure that are bonded together by an adhesive. Most typically, the adhesive is applied only to the tips of the embossing knobs of an embossing roll. This area is known from the manufacturer of the embossing rolls, from which the manufacturer of the fibrous structure can obtain such bond area measurement.

Additionally, the bond area can be measured by taking a sample of fibrous structure that comprises an adhesive comprising polyvinyl alcohol as the only adhesive, rather than a non-polyvinyl alcohol-containing adhesive. Accordingly, if a fibrous structure typically is made with a non-polyvinyl alcohol-containing adhesive, the maker of such a fibrous structure will need to replace its non-polyvinyl alcohol-containing adhesive with an adhesive comprising polyvinyl alcohol. The maker will then produce its fibrous structure in the identical manner as it does when making its non-polyvinyl alcohol-containing fibrous structure.

Next, the sample of fibrous structure comprising the adhesive comprising polyvinyl alcohol is subjected to an 8:1 ratio by volume of boric acid solution to iodine solution mixture. The boric acid solution is a 4% boric acid solution in deionized water. The iodine solution is a 0.1 N iodine solution in deionized water. The mixture is sprayed onto the sample. The polyvinyl alcohol in the adhesive will turn bluish green. The resulting image can be analyzed for % bond area (i.e., adhesive area coverage) using standard image analysis techniques.

Also, the bond area of a sample of fibrous structure that comprises a non-polyvinyl alcohol-containing adhesive as the only adhesive can be measured by subjecting such a sample to a method that identifies the area of the fibrous structure sample that comprises the non-polyvinyl alcohol-containing adhesive. For example, by subjecting the fibrous structure sample to a condition, such as a chemical agent, that colorizes the non-polyvinyl alcohol-containing adhesive making it readily visible for image analysis techniques. Another example includes subjecting the fibrous structure sample to a condition, such as a chemical agent, that colorizes everything but the non-polyvinyl alcohol-containing adhesive making the adhesive readily visible for image analysis techniques.

If any one of these techniques identifies a fibrous structure sample as comprising a bond area of from about 0.1% to about 30% of the surface area of the adjacent surfaces of the two or more plies, then the fibrous structure satisfies the bond area aspect of the present invention.

Embossment Height Test Method

Embossment height is measured using a GFM Primos Optical Profiler instrument commercially available from GFMesstechnik GmbH, Warthestraβe 21, D14513 Teltow/Berlin, Germany. The GFM Primos Optical Profiler instrument includes a compact optical measuring sensor based on the digital micro mirror projection, consisting of the following main components: a) DMD projector with 1024×768 direct digital controlled micro mirrors, b) CCD camera with high resolution (1300×1000 pixels), c) projection optics adapted to a measuring area of at least 27×22 mm, and d) recording optics adapted to a measuring area of at least 27×22 mm; a table tripod based on a small hard stone plate; a cold light source; a measuring, control, and evaluation computer; measuring, control, and evaluation software ODSCAD 4.0, English version; and adjusting probes for lateral (x-y) and vertical (z) calibration.

The GFM Primos Optical Profiler system measures the surface height of a sample using the digital micro-mirror pattern projection technique. The result of the analysis is a map of surface height (z) vs. xy displacement. The system has a field of view of 27×22 mm with a resolution of 21 microns. The height resolution should be set to between 0.10 and 1.00 micron. The height range is 64,000 times the resolution.

To measure a fibrous structure sample do the following:

1. Turn on the cold light source. The settings on the cold light source should be 4 and C, which should give a reading of 3000K on the display;
2. Turn on the computer, monitor and printer and open the ODSCAD 4.0 Primos Software.
3. Select "Start Measurement" icon from the Primos taskbar and then click the "Live Pic" button.
4. Place a 30 mm by 30 mm sample of fibrous structure product conditioned at a temperature of 73° F.±2° F. (about 23° C.±1° C.) and a relative humidity of 50%±2% under the projection head and adjust the distance for best focus.
5. Click the "Pattern" button repeatedly to project one of several focusing patterns to aid in achieving the best focus (the software cross hair should align with the projected cross hair when optimal focus is achieved). Position the projection head to be normal to the sample surface.

6. Adjust image brightness by changing the aperture on the lens through the hole in the side of the projector head and/or altering the camera "gain" setting on the screen. Do not set the gain higher than 7 to control the amount of electronic noise. When the illumination is optimum, the red circle at bottom of the screen labeled "I.O." will turn green.

7. Select Technical Surface/Rough measurement type.

8. Click on the "Measure" button. This will freeze on the live image on the screen and, simultaneously, the image will be captured and digitized. It is important to keep the sample still during this time to avoid blurring of the captured image. The image will be captured in approximately 20 seconds.

9. If the image is satisfactory, save the image to a computer file with ".omc" extension. This will also save the camera image file ".kam".

10. To move the date into the analysis portion of the software, click on the clipboard/man icon.

11. Now, click on the icon "Draw Cutting Lines". Make sure active line is set to line 1. Move the cross hairs to the lowest point on the left side of the computer screen image and click the mouse. Then move the cross hairs to the lowest point on the right side of the computer screen image on the current line and click the mouse. Now click on "Align" by marked points icon. Now click the mouse on the lowest point on this line, and then click the mouse on the highest point on this line. Click the "Vertical" distance icon. Record the distance measurement. Now increase the active line to the next line, and repeat the previous steps, do this until all lines have been measured (six (6) lines in total. Take the average of all recorded numbers, and if the units is not micrometers, convert it to micrometers ($\mu$m). This number is the embossment height. Repeat this procedure for another image in the fibrous structure product sample and take the average of the embossment heights.

Wet Burst Strength Test Method

Wet burst strength may be measured using a Thwing-Albert Burst Tester Cat. No. 177 equipped with a 2000 g load cell commercially available from Thwing-Albert Instrument Company, Philadelphia, Pa.

Wet burst strength is measured by taking two (2) multi-ply fibrous structure product samples. Using scissors, cut the samples in half in the MD so that they are approximately 228 mm in the machine direction and approximately 114 mm in the cross machine direction, each two (2) plies thick (you now have 4 samples). First, condition the samples for two (2) hours at a temperature of 73° F.±2° F. (about 23° C.±1° C.) and a relative humidity of 50%±2%. Next age the samples by stacking the samples together with a small paper clip and "fan" the other end of the stack of samples by a clamp in a 105° C. (±1° C.) forced draft oven for 5 minutes (±10 seconds). After the heating period, remove the sample stack from the oven and cool for a minimum of three (3) minutes before testing. Take one sample strip, holding the sample by the narrow cross machine direction edges, dipping the center of the sample into a pan filled with about 25 mm of distilled water. Leave the sample in the water four (4) (±0.5) seconds. Remove and drain for three (3) (±0.5) seconds holding the sample so the water runs off in the cross machine direction. Proceed with the test immediately after the drain step. Place the wet sample on the lower ring of a sample holding device of the Burst Tester with the outer surface of the sample facing up so that the wet part of the sample completely covers the open surface of the sample holding ring. If wrinkles are present, discard the samples and repeat with a new sample. After the sample is properly in place on the lower sample holding ring, turn the switch that lowers the upper ring on the Burst Tester. The sample to be tested is now securely gripped in the sample holding unit. Start the burst test immediately at this point by pressing the start button on the Burst Tester. A plunger will begin to rise toward the wet surface of the sample. At the point when the sample tears or ruptures, report the maximum reading. The plunger will automatically reverse and return to its original starting position. Repeat this procedure on three (3) more samples for a total of four (4) tests, i.e., four (4) replicates. Report the results as an average of the four (4) replicates, to the nearest g.

Sheet Caliper Test Method

Sheet Caliper or Caliper of a sample of fibrous structure product is determined by cutting a sample of the fibrous structure product such that it is larger in size than a load foot loading surface where the load foot loading surface has a circular surface area of about 3.14 in$^2$. The sample is confined between a horizontal flat surface and the load foot loading surface. The load foot loading surface applies a confining pressure to the sample of 14.7 g/cm$^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in mils.

Stretch Test Method

Stretch is measured by providing one (1) inch by five (5) inch (2.5 cm×12.7 cm) strips of fibrous structure. Each strip is placed on an electronic tensile tester Model 1122 commercially available from Instron Corp., Canton, Mass. in a conditioned room at a temperature of 73° F.±2° F. (about 23° C.±1° C.) and a relative humidity of 50%±2%. The crosshead speed of the tensile tester is 2.0 inches per minute (about 5.1 cm/minute) and the gauge length is 4.0 inches (about 10.2 cm). The Stretch at Peak Load is measured.

All documents cited in the Detailed Description of the Invention are, in relevant part, incorporated herein by reference; the citation of any document is not to be considered as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An embossed multi-ply fibrous structure product comprising and x-plane and a y-direction, two or more plies of fibrous structure bonded together along adjacent surfaces of the two or more plies by an adhesive to form a bond area, wherein the bond area is less than about 30% of the bonded adjacent surfaces, wherein the product comprises two faces, wherein one face comprises non-adhesively bonded embossed sites and the other face comprises adhesively bonded non-embossed sites, wherein the embossment sites are non-densified and wherein the non-embossed sites are densified wherein the density of the densified non-embossed sites is greater than the density of the non-densified embossed sites, and the embossed sites extend in the y-direction from the x-plane of the embossed multi-ply fibrous structure product wherein the fibrous structure product exhibits an embossment height of at least about 1000 $\mu$m, and wherein the embossed multi-ply fibrous structure product, when in roll form, exhibits an average effective caliper that is greater than the average sheet caliper of an identical multi-ply fibrous structure in its non-embossed form.

2. The fibrous structure product according to claim 1 wherein the two or more plies of fibrous structure are bonded together at a plybond strength of at least about 4 g/in.

3. The fibrous structure product according to claim 1 wherein the fibrous structure product exhibits a wet burst of at least about 305 g.

4. The fibrous structure product according to claim 1 wherein the fibrous structure product exhibits a sheet caliper of at least about 40 mils.

5. The fibrous structure product according to claim 1 wherein the fibrous structure product exhibits a sheet caliper to effective caliper ratio of greater than 1.1.

6. The fibrous structure product according to claim 1 wherein the fibrous structure product exhibits a cross machine direction stretch at peak load of greater than 8%.

7. The fibrous structure product according to claim 1 wherein the fibrous structure product is in roll form.

8. The fibrous structure product according to claim 1 wherein the adhesive is present on the adjacent surfaces in the form of separate, discrete dots and/or separate, discrete stripes.

9. The fibrous structure product according to claim 1 wherein at least one of the two or more plies of fibrous structure comprises a fibrous structure selected from the group consisting of: through-air-dried fibrous structure plies, differential density fibrous structure plies, wet laid fibrous structure plies, air laid fibrous structure plies, conventional fibrous structure plies and mixtures thereof.

* * * * *